Nov. 7, 1933.  J. NUERNBERGER ET AL  1,934,321

PLOW

Filed Aug. 29, 1932

INVENTORS:
J. Nuernberger
L. Besuch

Marks & Clerk
Attys.

By

Patented Nov. 7, 1933

1,934,321

UNITED STATES PATENT OFFICE 1,934,321

PLOW

John Nuernberger, Wilmersdorf, near Berlin, and Leopold Besuch, Siemensstadt, near Berlin, Germany Application August 29, 1932, Serial No. 630,966, and in Germany November 3, 1931

2 Claims. (Cl. 97—53)

Plows are already known, the frame of which, consisting of the forwardly extending handle and beam and the rearwardly extending stilts, accommodates a share in the form of a rotatable hollow disc. These known plows have the disadvantage that, in order to draw a furrow parallel with the beam, the machine has to be pressed forcibly into the soil. For this reason, the plow can only be worked by draught animals. Moreover, each plow has to be provided with a special anchoring device located in rear of the hollow disc, or with a special auxiliary share or other means, for enabling the plow to be driven in an at least approximately straight line. Such auxiliary attachments not only make the plow more difficult to work, but also increase the cost.

By comparison therewith, the characteristic of the present invention is the combination of the followng individually known features:—

(a) The axis of the hollow disc is inclined towards the horizontal and at an angle in relation to the longitudinal direction of the beam:

(b) The hollow disc is in the form of a hollow cone with straight sides (V-shaped); and (c) That portion of the wall of the hollow disc that is adjacent to the beam, lies parallel with the latter.

This construction of the plow not only dispenses with special auxiliary devices, but also makes it so simple and easy to operate that it can be worked, without special stress, even by persons of inferior physique.

A typical embodiment of the invention is illustrated in the accompanying drawing, in which:—

Figure 1:
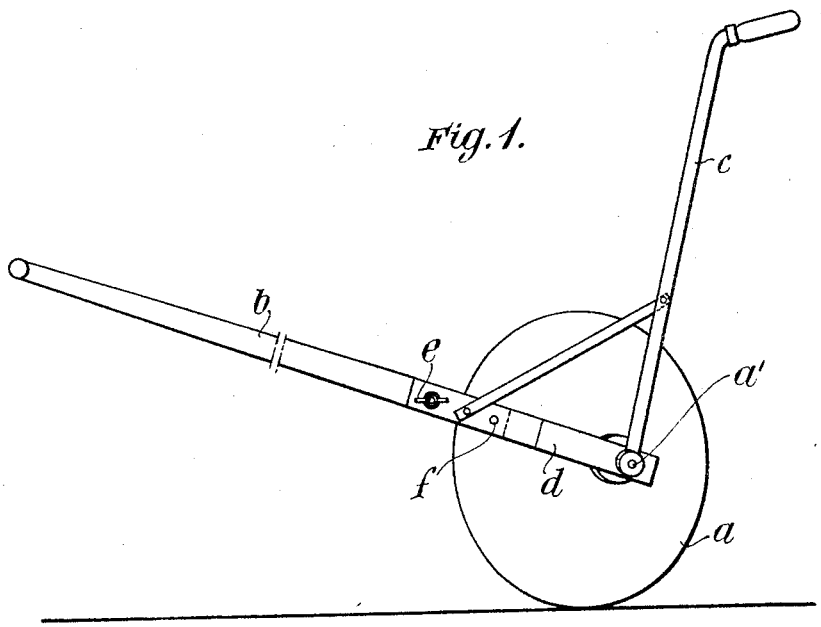
Fig. 1 is a side elevation of the new plow.
Figure 2:
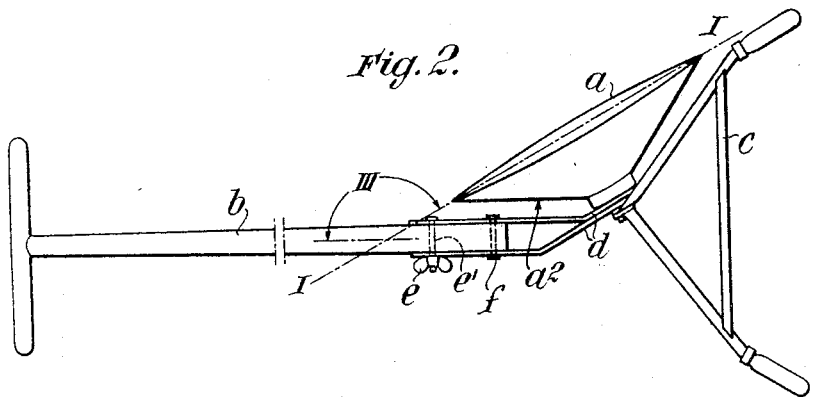
Fig. 2 is a corresponding plan.
Figure 3:
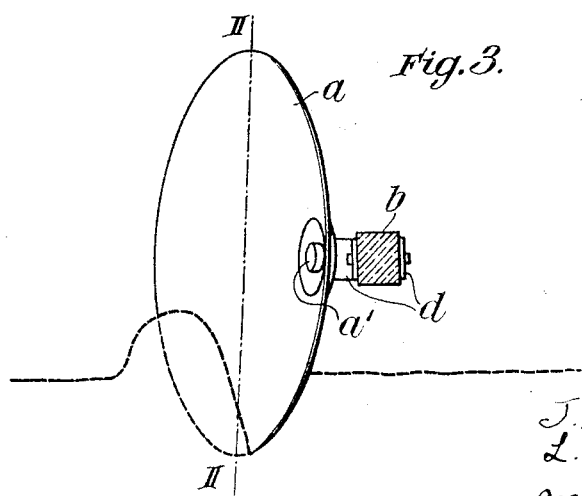
Fig. 3 is a front elevation of the rotary disc on a larger scale.

Reference character $a$ denotes the conical hollow disc with straight sides, $b$ the beam with handle, and $c$ the stilts in the rear. The axle $a^1$ of the disc $a$ is mounted on a laterally bent portion $d$ of the beam, in such a manner that the hollow disc $a$ diverges from the longitudinal axis of the beam $b$ in the direction of the line I—I in Fig. 2, and is also obliquely disposed in the direction of the line II—II in Fig. 3. The hollow disc $a$ is preferably so mounted that the line I—I forms with the longitudinal axis of the beam $b$ an angle III of about 150°, this relation having proved particularly satisfactory. As shown in Fig. 2, when the disc $a$ is disposed in the described position, the portion $a^2$ of the disc surface adjacent to the beam is parallel with the latter.

Plowing with the new plow is performed in the following manner:—While one person draws the plow by means of the handle of the beam $b$, the second person presses the hollow disc $a$ to a suitable depth in the soil, by means of the stilts $c$, and guides the plow accordingly. As the result of the hollow disc $a$ being designed and disposed in the described manner, it rotates automatically in the forward direction and cuts its way through the ground (indicated by broken lines in Fig. 3) which it pulverizes and then turns aside and over.

Plowing with the new plow is at least ten times as fast as digging with a spade, and is not half so fatiguing; the plow works easily and quickly through any soil, even heavy ground; the overturning and loosening of the soil, and mixing it with dung, is quite as thorough as in digging; and the soil is uniformly worked and forms a clean, smooth surface afterwards.

By unscrewing the wing nut $e$ and withdrawing the screw pin $e^1$, the beam $b$ can be turned up on the pivot $f$, so that the machine occupies less room than when in the working position. Moreover, a draught hook for the attachment of a haulage strap or the like, may be provided in a suitable position.

We claim:—

1. A plow comprising, in combination, a draught beam and rearward stilts together forming a frame, a bearing in said frame, and a rotary share mounted in said bearing, said share being a straight-sided hollow conical disc, said bearing being inclined to the horizontal and at an angle to the longitudinal direction of the beam such that the beam and the surface of the share adjacent thereto are parallel, and said beam including a forwardly extending portion pivoted for folding back upon said stilts and means for locking said portion in its draught position.

2. A plow comprising, in combination, a draught beam including a body portion, a forwardly extending portion pivotally connected to said body portion, means for locking said portions in alignment, a laterally bent rearward extension of said body portion, rearward stilts secured to said extension, a bearing in said extension, and a straight-sided hollow conical rotary share, having an apical angle of substantially 150°, mounted in said bearing with its horizontal diameter at an angle of substantially 150° to the longitudinal direction of the beam and with its axis inclined to the horizontal.

JOHN NUERNBERGER.
LEOPOLD BESUCH.